United States Patent Office 3,165,494
Patented Jan. 12, 1965

3,165,494
ORGANOSILOXANE COMPOSITIONS CONTAINING ALKOXYDISILANES AS ROOM TEMPERATURE CROSS-LINKING AGENTS
Frederick A. Smith, Kenmore, N.Y., assignor to Union Carbide Corporation, a corporation of New York
No Drawing. Filed Dec. 28, 1960, Ser. No. 78,803
12 Claims. (Cl. 260—37)

This invention relates to room temperature curable organosiloxane compositions. More particularly, this invention relates to compositions containing hydroxy end-blocked organosiloxane fluids and an alkoxy disilane compound and to the elastomers produced therefrom.

The present invention is based, in part, upon the discovery that compositions comprising (1) a hydroxy end-blocked diorganopolysiloxane fluid (2) an alkoxydisilane or partial hydrolyzate thereof and (3) as a catalyst a metal salt of a carboxylic acid; are curable to organosiloxane elastomers at room temperature. The compositions of this invention can also contain a filler if desired.

The hydroxy end-blocked diorganopolysiloxane fluids which can be employed in the compositions of this invention are comprised of essentially linear polymeric chains composed of units of the formula:

[RR'SiO]        (1)

and which have hydroxy groups bonded to each of the terminal silicon atoms of each chain. In the above formula, R and R' represent organic radicals, as for example, monovalent hydrocarbon groups such as alkyl, aryl, alkaryl, aralkyl, cycloalkenyl, and alkenyl groups including methyl, ethyl, propyl, butyl, phenyl, phenylethyl, naphthyl cyclopentyl, cyclohexyl vinyl, allyl, cyclohexenyl and the like; and carbon-functional groups which are substituted hydrocarbon groups bonded to the silicon atom through a carbon to silicon linkage and in which groups the carbon-functional substituent is removed by at least two carbon atoms of a saturated hydrocarbon chain from silicon. Typical of such carbon-functional groups are: beta-cyanoethyl, gamma-cyanopropyl, cyanophenyl, gamma-nitropropyl, nitrophenyl, chlorophenyl, difluorophenyl, the fluorinated alkyl groups such as gamma, gamma, gamma-trifluoropropyl and the like.

The hydroxy end-blocked organopolysiloxane fluids are further characterized by viscosities at 25° C. of from about 100 cps. up to about 2,000,000 cps. and preferably in the range of from about 1,000 to about 50,000 cps. For the most part such organopolysiloxanes will vary from pourable liquids to viscous fluids which will slowly flow when poured. Such organopolysiloxanes are further characterized by an organic group to silicon atom ratio of from about 1.95:1 to 2:1 and contain one hydroxy group bonded to each of the terminal silicon atoms of the polymer chains.

The alkoxydisilane compounds suitable for use in the present invention can be characterized by the following formula:

(R"O)₃Si—Si(OR")₃        (2)

wherein R" represents an alkyl group, as for example, methyl, ethyl and the like.

The alkoxydisilane compounds suitable for use in the present invention also include the partial hydrolyzates of the alkoxy disilanes of Formula 2 which can be represented by the formula:

(3)

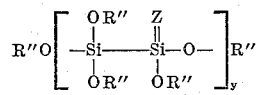

wherein R" is as above-defined, y is an integer of at least 2 and Z is an alkoxy group or a group of the formula

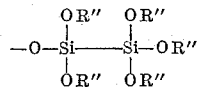

wherein R" is as previously defined.

These liquid partial hydrolyzates are generally obtained by effecting partial water hydrolysis of the particular monomeric alkoxydisilane in the presence of a small amount of acid to a point where the hydrolyzate is still liquid, is water insoluble and it is possible to isolate a liquid partially hydrolyzed organosilicon compound. Thus, for example, hexaethoxydisilane can be partially hydrolyzed by adding sufficient water thereto to hydrolyze one or two of the silicon-bonded alkoxy groups employing a small amount of an acid such as hydrochloric acid as the catalyst.

The metal salts of carboxylic acids which can be employed as the catalyst in preparing the room-temperature-curable compositions of the present invention include the carboxylic acid salts of lead, tin, zirconium, iron, cadmium, titanium, calcium and manganese. It is preferred that the carboxylic acid salts of the above metals be characterized by the property that the carboxylic acid radical contains from 3 to 14 carbon atoms. While the metal salts of acetic acid can be employed, it has been found that the acetic acid salts cause a rapid curing of the composition to an elastomer so as to make such a system difficult to handle. While the metal salts containing more than 14 carbon atoms are operable to cure the compositions to elastomers, it has been found that such salts leave an oily residue in the elastomer thereby making the elastomer feel greasy to the touch. It is preferred that the salt be soluble in the hydroxy end-blocked diorganopolysiloxane fluid although insoluble salts can be employed if they are properly dispersed in the system. Typical of the metal salts of carboxylic acids which are operative are the naphthenates, oleates, benzoates, propionates, butyrates, hexoates, laurates, linoleates, stearates, and octoates of the above metals.

While a filler is not necessary to form the room temperature curing compositions of this invention a filler can be employed, if desired to give higher tensile strengths to the elastomers produced.

The fillers which can be employed in the composition of this invention are any of those commonly employed in the art and include, for example, titanium dioxide, silica, of the fumed or precipitated type, calcium carbonate, diatomaceous earth, silica aerogel, carbon black and the like. When employing carbon black as the filler it is usually employed in combination with other fillers and is preferably not present in amounts more than 50% by weight of the total fillers present. It is preferred that at least 50% by weight of the total filler constitute a finely divided silica.

The amount of the filler employed in the composition of this invention can be from 10 to 200 parts by weight per 100 parts by weight of the hydroxy end-blocked diorganopolysiloxane fluid. It is preferred to employ the filler in amounts of from 20 to 60 parts by weight filler per 100 parts by weight of the diorganosiloxane fluid.

The amount of alkoxydisilane compound employed in the compositions of this invention can range from 0.1 to 10 parts by weight of the alkoxydisilane compound per 100 parts by weight of the diorganopolysiloxane fluid. It is preferred that said alkoxydisilane compound be employed in amounts of from 2 to 5 parts by weight per 100 parts by weight of the fluid.

The metal salt of the carboxylic acid, which is employed as the catalyst for the room-temperature curable composition of this invention can be employed in amounts of from 0.5 to 5.0 parts by weight per 100 parts by weight of the diorganopolysiloxane fluid. It is preferred that such catalyst be employed in amounts from 1 to 2 parts by weight per 100 parts by weight of the diorganopolysiloxane fluid.

The hydroxy end-blocked diorganopolysiloxane can be prepared by the steps of hydrolyzing or cohydrolyzing one or more monomeric silanes containing two silicon bonded hydrolyzable groups and treating the resulting hydrolyzate to prepare pure polymers in the form of cyclic siloxanes which are then subjected to equilibration (polymerization) procedures to yield essentially linear polymers of high molecular weight. Such polymers are then reacted with limited amounts of water and at elevated temperatures for varying periods of time to produce the desired starting hydroxy end-blocked diorganopolysiloxane.

Preparation of the room temperature curing composition is accomplished by simply thoroughly admixing the ingredients and permitting curing to take place. In most instances it will be preferred to add the metal salt of the carboxylic acid last, to prevent premature curing of the composition. It has been found that the composition in the absence of the metal salt of the carboxylic acid can be stored for several months without any cure taking place.

The room-temperature curing compositions of the present invention employing alkoxydisilanes and the partial hydrolyzates thereof are characterized by desirable improved elongation and compressive strength properties. While the exact mechanism by which such improvement is not fully known or understood it is postulated that the increased length of the cross-linking unit of the alkoxydisilane compound provides a more flexible cross-linking unit as compared to the cross-linking units present when silicates are employed for this same purpose.

The room-temperature curable compositions of this invention are useful in the production of organosiloxane elastomers at room-temperature. The compositions of the invention are particularly useful in sealing, puttying caulking operations.

The following examples serve to illustrate the invention, all parts are by weight unless otherwise specified.

*Example I*

A description of the preparation of a hydroxy end-blocked diorganopolysiloxane fluid.

Hexamethylcyclotrisiloxane (100 parts), water (45 parts) and ammonia (100 parts) are charged to an autoclave and heated to 150° C. for several hours. A dimethylpolysiloxane having a hydroxyl group bonded to each of the terminal silicon atoms thereof was obtained in about 75% yield. This dimethylpolysiloxane had a viscosity at room-temperature of 50 centipoises, contained 3% by weight hydroxy groups and contained approximately 11 to 13 [(CH$_3$)$_2$SiO] units per chain.

Approximately one gallon of the above material was mixed with 10 grams of calcium zeolite X, a synthetic zeolite, and heated to 150° C. for 35 hours to cause the material to condense and form a dimethylpolysiloxane fluid having a hydroxyl group bonded to each of the terminal silicon atoms thereof and having a higher viscosity. After cooling to room temperature, the calcium zeolite X was removed by filtration to yield a dimethylpolysiloxane fluid of 20,000 centipoises viscosity at room temperature and having a hydroxyl group bonded to each terminal silicon atom thereof.

*Example II*

Ten grams of a hydroxy end-blocked dimethylpolysiloxane, prepared according to the procedure of Example I but having a viscosity of 28,000 centistokes at room-temperature, were placed in a small dish and thoroughly mixed with 0.5 gram of hexaethoxydisilane. Tin octoate containing 28% tin (0.2 gram) was then stirred into the mixture. Within thirty minutes at room-temperature the mixture changed from a viscous fluid to a tough, springy, resilient, rubbery elastomer. The material had permanently taken the shape of the dish in which it had been allowed to cure, and when stretched or deformed and released, it immediately returned to its cured shape.

*Example III*

Ten grams of the following mixture were placed in a glass vessel:

100 grams of hydroxy end-blocked dimethylpolysiloxane, 36,000 cstks.

35 grams of Celite Superfloss a finely divided diatomaceous silica.

2 grams of Titanox RA-50 a finely divided titanium dioxide.

Then, 0.5 gram of hexaethoxydisilane was added and the ingredients were thoroughly mixed, 0.2 gram tin octoate containing 28% tin (0.2 gram) was then added and thoroughly mixed. A tough rubbery solid elastomer of excellent resilience was obtained within 15 minutes at room-temperature. The mechanical properties improved slightly over the next few hours, but beyond this they remained constant. This elastomer having silica filler had appreciably better cohesive strength than the elastomer described in Example II.

What is claimed is:

1. A composition of matter curable to an elastomer at room-temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R' are monovalent organic radicals selected from the class consisting of monovalent hydrocarbon groups and monovalent carbon-functional substituted hydrocarbon groups, said substituted hydrocarbon groups bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room-temperature and having an organic group to silicon atom ratio of from about 1.95:1 to 2:1, (2) from 0.1 to 10 parts by weight of an alkoxydisilane compound containing at least six alkoxy groups, said alkoxydisilane compound being selected from the class consisting of alkoxydisilanes of the formula:

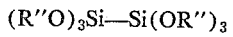

and the partial hydrolyzates thereof, wherein R'' is an alkyl group and (3) from 0.5 to 5 parts by weight of a metal salt of a carboxylic acid wherein the metal is selected from the class consisting of lead, tin, zirconium, iron, cadmium, titanium, calcium and manganese.

2. A composition of matter curable to an elastomer at room-temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R' are monovalent organic radicals selected from the class consisting of monovalent hydrocarbon groups and monovalent carbon-functional substituted hydrocarbon groups, said substituted hydrocarbon groups bonded to the silicon atom through a carbon to silicon linkage and wherein the carbon-functional substituent is removed by at least two carbon atoms of a saturated hydrocarbon chain from the silicon atom, said fluid having a viscosity of from 1000 to 50,000 centipoises at room-temperature and having an organic group to silicon atom ratio of from about 1.95:1 to 2:1, (2) from 2 to 5 parts by weight of an alkoxydisilane compound containing at least six alkoxy groups, said alkoxydisilane compound being selected from the class consisting of alkoxydisilanes of the formula:

(R"O)₃Si—Si(OR")₃ and the partial hydrolyzates thereof, wherein R" is an alkyl group and (3) from 1 to 2 parts by weight of a catalyst selected from the class consisting of the lead, tin, zirconium, iron, cadmium, titanium, calcium and manganese salts of a carboxylic acid.

3. A composition of matter curable to an elastomer at room-temperature which comprises (1) 100 parts by weight of a dimethylpolysiloxane fluid having a hydroxy group bonded to each of the terminal silicon atoms thereof, said fluid being an essentially linear dimethylpolysiloxane composed of units of the formula:

said fluid having a viscosity of from 1000 to 50,000 centipoises at room-temperature and having a methyl group to silicon atom ratio of from about 1.95:1 to 2:1, (2) from 2 to 5 parts by weight of hexaethoxydisilane and (3) from 1 to 2 parts by weight of a catalyst selected from the class consisting of the lead, tin, zirconium, iron, cadmium, titanium, calcium and manganese salts of a carboxylic acid.

4. A composition of matter curable to an elastomer at room-temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R' are monovalent organic radicals selected from the class consisting of monovalent hydrocarbon groups and monovalent carbon-functional substituted hydrocarbon groups, said substituted hydrocarbon groups bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room-temperature and having an organic group to silicon atom ratio of from about 1.95:1 to 2:1, (2) from 0.1 to 10 parts by weight of an alkoxydisilane compound containing at least six alkoxy groups, said alkoxydisilane compound being selected from the class consisting of alkoxydisilanes of the formula:

(R"O)₃Si—Si(OR")₃ and the partial hydrolyzates thereof, wherein R" is an alkyl group (3) from 10 to 200 parts by weight of a filler and (4) from 0.5 to 5 parts by weight of a metal salt of a carboxylic acid wherein the metal is selected from the class consisting of lead, tin, zirconium, iron, cadmium, titanium, calcium and manganese.

5. A composition of matter curable to an elastomer at room-temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula:

where R and R' are monovalent organic radicals selected from the class consisting of monovalent hydrocarbon groups and monovalent carbon-functional substituted hydrocarbon groups, said substituted hydrocarbon groups bonded to the silicon atom through a carbon to silicon linkage and wherein the carbon-functional substituent is removed by at least two carbon atoms of a saturated hydrocarbon chain from the silicon atom, said fluid having a viscosity of from 1000 to 50,000 centipoises at room-temperature and having an organic group to silicon atom ratio of from about 1.95:1 to 2:1, (2) from 2 to 5 parts by weight of an alkoxydisilane compound containing at least six alkoxy groups, said alkoxydisilane compound being selected from the class consisting of alkoxydisilanes of the formula:

(R"O)₃Si—Si(OR")₃ and the partial hydrolyzates thereof, wherein R" is an alkyl group (3) from 20 to 60 parts by weight of a filler and (4) from 1 to 2 parts by weight of a catalyst selected from the class consisting of the lead, tin, zirconium, iron, cadmium, titanium, calcium and manganese salts of a carboxylic acid.

6. A composition of matter curable to an elastomer at room-temperature which comprises (1) 100 parts by weight of a dimethylpolysiloxane fluid having a hydroxy group bonded to each of the terminal silicon atoms thereof, said fluid being an essentially linear dimethylpolysiloxane composed of units of the formula:

said fluid having a viscosity of from 1000 to 50,000 centipoises at room-temperature and having a methyl group to silicon atom ratio of from about 1.95:1 to 2:1, (2) from 2 to 5 parts by weight of hexaethoxydisilane, (3) from 20 to 60 parts by weight of a filler and (4) from 1 to 2 parts by weight of a catalyst selected from the class consisting of the lead, tin, zirconium, iron, cadmium, titanium, calcium, and manganese salts of a carboxylic acid.

7. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R' are monovalent organic radicals selected from the class consisting of monovalent hydrocarbon groups and monovalent carbon-functional substituted hydrocarbon groups, said substituted hydrocarbon groups bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room-temperature and having an organic group to silicon atom ratio of from about 1.95:1 to 2:1, (2) from 0.1 to 10 parts by weight of an alkoxydisilane compound containing at least six alkoxy groups, said alkoxydisilane compounds being selected from the class consisting of alkoxydisilanes of the formula:

(R"O)₃Si—Si(OR")₃ and the partial hydrolyzates thereof, wherein R" is an alkyl group and (3) from 0.5 to 5 parts by weight of a metal salt of a carboxylic acid wherein the metal is selected from the class consisting of lead, tin, zirconium, iron, cadmium, titanium, calcium and manganese.

8. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane composed of units of the formula:

where R and R' are monovalent organic radicals selected from the class consisting of monovalent hydrocarbon groups and monovalent carbon-functional substituted hydrocarbon groups, said substituted hydrocarbon groups bonded to the silicon atom through a carbon to silicon linkage and wherein the carbon-functional substituent is removed by at least two carbon atoms of a saturated hydrocarbon chain from the silicon atom, said fluid having a viscosity of from 1000 to 50,000 centipoises at room-temperature and having an organic group to silicon atom ratio of from about 1.95:1 to 2:1, (2) from 2 to 5 parts by weight of an alkoxydisilane compound containing at least six alkoxy groups, said alkoxydisilane compound being selected from the class consisting of alkoxydisilanes of the formula:

$$(R''O)_3Si-Si(OR'')_3$$

and the partial hydrolyzates thereof, wherein R'' is an alkyl group, and (3) from 1 to 2 parts by weight of a catalyst selected from the class consisting of the lead, tin, zirconium, iron, cadmium, titanium, calcium and manganese salts of a carboxylic acid.

9. The cured composition obtained from a mixture of ingredients comprising (1) 100 parts by weight of a dimethylpolysiloxane fluid having a hydroxy group bonded to each of the terminal silicon atoms thereof, said fluid being an essentially linear dimethylpolysiloxane composed of units of the formula:

said fluid having a viscosity of from 1000 to 50,000 centipoises at room-temperature and having from about 1.95 to 2 methyl groups per silicon, (2) from 2 to 5 parts by weight of hexaethoxydisilane and (3) from 1 to 2 parts by weight of a catalyst selected from the class consisting of the lead, tin, zirconium, iron, cadmium, titanium, calcium and manganese salts of a carboxylic acid.

10. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R' are monovalent organic radicals selected from the class consisting of monovalent hydrocarbon groups and monovalent carbon-functional substituted hydrocarbon groups, said substituted hydrocarbon groups bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room-temperature and having an organic group to silicon atom ratio of from about 1.95:1 to 2:1, (2) from 0.1 to 10 parts by weight of an alkoxy-disilane compound containing at least six alkoxy groups, said alkoxydisilane compound being selected from the class consisting of alkoxydisilanes of the formula:

$$(R''O)_3Si-Si(OR'')_3$$

and the partial hydrolyzates thereof, wherein R'' is an alkyl group, (3) from 10 to 200 parts by weight of a filler and (4) from 0.5 to 5 parts by weight of a metal salt of a carboxylic acid wherein the metal is selected from the class consisting of lead, tin, zirconium, iron, cadmium, titanium, calcium and manganese.

11. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R' are monovalent organic radicals selected from the class consisting of monovalent hydrocarbon groups and monovalent carbon-functional substituted hydrocarbon groups, said substituted hydrocarbon groups bonded to the silicon atom through a carbon to silicon linkage and wherein the carbon-functional substituent is removed by at least two carbon atoms of a saturated hydrocarbon chain from the silicon atom, said fluid having a viscosity of from 1000 centipoises to 50,000 centipoises at room-temperature and having an organic group to silicon atom ratio of from about 1.95:1 to 2:1, (2) from 2 to 5 parts by weight of an alkoxydisilane compound containing at least six alkoxy groups, said alkoxydisilane compound being selected from the class consisting of alkoxydisilanes of the formula:

$$(R''O)_3Si-Si(OR'')_3$$

and the partial hydrolyzates thereof, wherein R'' is an alkyl group, (3) from 20 to 60 parts by weight of a filler and (4) from 1 to 2 parts by weight of a metal salt of a carboxylic acid wherein the metal is selected from the class consisting of lead, tin, zirconium, iron, cadium, titanium, calcium and manganese.

12. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane composed of units of the formula:

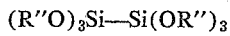

said fluid having a viscosity of from 1000 to 50,000 centipoises at room-temperature and having a methyl group to silicon atom ratio of from about 1.95:1 to 2:1, (2) from 2 to 5 parts by weight of hexaethoxydisilane, (3) from 20 to 60 parts by weight of a filler and (4) from 1 to 2 parts by weight of a catalyst selected from the class consisting of the lead, tin, zirconium, iron, cadmium, titanium, calcium and manganese salts of a carboxylic acid.

References Cited in the file of this patent

UNITED STATES PATENTS

| | | |
|---|---|---|
| 2,490,691 | Langkammerer | Dec. 6, 1949 |
| 2,843,555 | Berridge | July 15, 1958 |
| 2,881,197 | Kuriyagawa et al. | Apr. 7, 1959 |
| 2,902,467 | Chipman | Sept. 1, 1959 |
| 2,927,907 | Polmanteer | Mar. 8, 1960 |
| 2,967,170 | Merker | Jan. 3, 1961 |

FOREIGN PATENTS

| | | |
|---|---|---|
| 216,878 | Australia | Aug. 29, 1958 |

UNITED STATES PATENT OFFICE
CERTIFICATE OF CORRECTION

Patent No. 3,165,494            January 12, 1965

Frederick A. Smith

It is hereby certified that error appears in the above numbered patent requiring correction and that the said Letters Patent should read as corrected below.

Column 1, lines 66 to 71, the formula should appear as shown below instead of as in the patent:

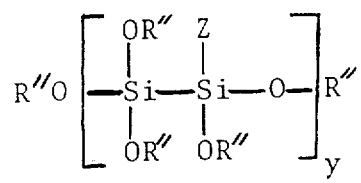

Signed and sealed this 3rd day of August 1965.

(SEAL)
Attest:

ERNEST W. SWIDER
Attesting Officer

EDWARD J. BRENNER
Commissioner of Patents